Feb. 10, 1953 W. A. STEVENSON 2,627,903
COMBINATION BABY SEAT AND ARMREST FOR AUTOMOBILES
Filed April 14, 1951
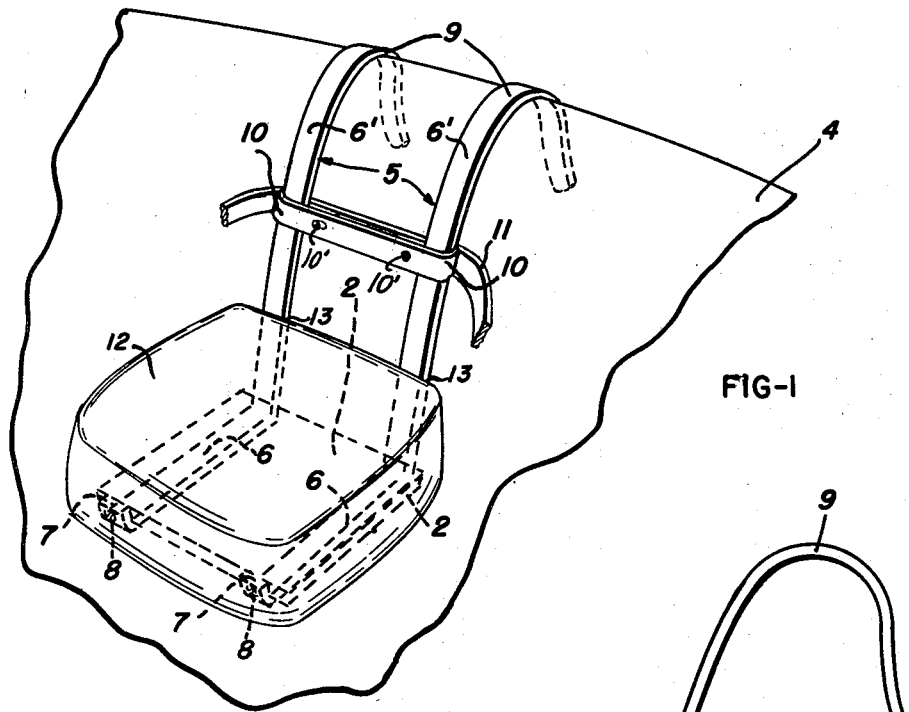
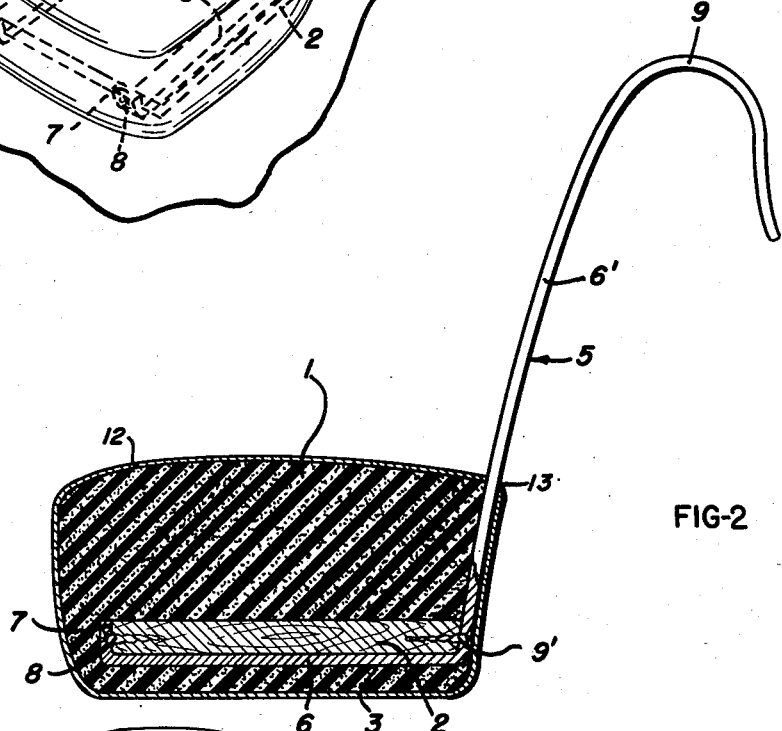
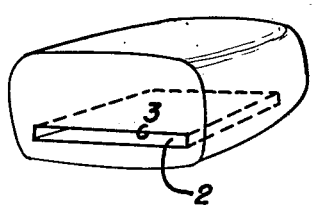
Inventor
William A. Stevenson Patented Feb. 10, 1953

2,627,903

UNITED STATES PATENT OFFICE 2,627,903

COMBINATION BABY SEAT AND ARMREST FOR AUTOMOBILES

William A. Stevenson, Opportunity, Wash., assignor to William B. Hopkins, Spokane, Wash.

Application April 14, 1951, Serial No. 221,001

1 Claim. (Cl. 155—11)

This invention relates to an accessory for an automobile and it is one object of the invention to provide a device which is adapted to be supported against the back of a seat of an automobile and serve as a seat for a baby or as an arm rest which may be used by persons seated in the automobile at opposite sides of the device.

Another object of the invention is to provide a device of this character including a pad consisting of a thick block of sponge rubber which is reinforced by a board embedded in the pad and to which are screwed hangers which project upwardly from the pad and are formed with hooks for engaging across the top of the back of an automobile seat and thereby support the pad in position for use.

Another object of the invention is to provide hangers having forwardly extending arms so connected with the board that movement of the board and the hangers relative to each other will be prevented and the pad held in its proper position when in use.

The invention is illustrated in the accompanying drawings wherein:

Fig. 1 is a perspective view showing the arm rest and baby's seat supported upon the back of an automobile seat.

Fig. 2 is a sectional view taken vertically through the pad and the reinforcing board for the pad.

Fig. 3 is a perspective view of the pad and its reinforcing board.

The pad 1 of the improved arm rest and baby's seat is formed of soft rubber, such as sponge rubber, and consists of a thick block of such rubber of such width that it will serve as a comfortable seat for a baby and also may be conveniently used as an arm rest by two persons seated in an automobile with the pad between them.

The pad is reinforced by a board 2 which may be formed of wood, or other suitable material, this board being mounted in a shallow pocket 3 which is formed horizontally in the pad near the bottom thereof. The pocket is open along the rear side face of the pad and is of such dimensions that the board fits snugly in the pocket and has its near edge face flush with the rear side face of the pad. Since the board fits snugly in the pocket the board and the pad have frictional binding engagement with each other and the board will not be liable to slip out of the pocket.

The pad is to be supported against the back 4 of an automobile seat and in order to do so there has been provided hangers 5 which are formed from metal strips. These metal strips are bent in spaced relation at their lower ends to form arms 6 which project forwardly from lower ends of shanks 6' and have their front ends bent to form upwardly extending fingers 7. The board rests upon upper surfaces of the arms 6 with its edge faces in close fitting engagement with the fingers 7 and lower end portions of the shanks and is firmly secured by screws 8 and 9' passed through openings in the fingers and the shanks and into the board with their heads counter sunk in the openings. The shanks extend upwardly against the rear face of the pad and project upwardly from the pad. A pliable covering material 12 fits snugly about the pad and has spaced openings 13—13 through which the upwardly extending shanks 6' pass. The shanks are bowed rearwardly and upper end portions of the strips from which the hangers are formed are bent rearwardly and downwardly to form hooks 9 of such shape and size that they will fit about the top of the back of an automobile seat and firmly hold the hangers to the seat back. The pad will then be supported in such position that it projects forwardly from the seat back at such a height that persons occupying the automobile seat may both conveniently use the pad as an arm rest. When a baby is placed upon the pad it is desirable that the baby be held in a seated position upon the pad and prevented from falling off of the pad. Therefore the strap or belt 11 is provided with spaced loops 10 which slip over the hangers 5 from their free ends in such position that the strap or belt 11 may be secured about the baby's abdomen. Rivets 10' secure the loops to strap 11.

Having thus described the invention, what is claimed is:

A combined arm rest and baby's seat for a vehicle comprising a thick pad of sponge rubber formed adjacent its bottom with a transversely extending slot forming a shallow pocket spaced from the front and opposite sides of the pad and open across its rear end for its full width, a flat board fitting snugly in said pocket and having its rear edge face exposed along the open rear end of the pocket, hangers consisting of metal strips having portions extending vertically and at their upper ends carried rearwardly and downwardly and forming hooks for engaging across the top of the back of a vehicle seat, lower portions of said strips bent forwardly and forming arms upon which the under face of said board rests, the front ends of said arms being bent upwardly and forming fingers, screws passing through said fingers and portions of the strips adjacent rear ends of the arms and into front and rear edge faces of the board and constituting securing members for the board, and a cover of pliable material fitting snugly about said pad and formed with openings through which vertical extending portions of the strips pass.

WILLIAM A. STEVENSON.

REFERENCES CITED

The following references are of record in the file of this patent:

UNITED STATES PATENTS

| Number | Name | Date |
|---|---|---|
| 1,420,023 | Decker | June 20, 1922 |
| 1,760,450 | Taylor | May 27, 1930 |
| 2,278,749 | Todd | Apr. 7, 1942 |
| 2,428,088 | McEachern | Sept. 30, 1947 |

FOREIGN PATENTS

| Number | Country | Date |
|---|---|---|
| 21,215/35 | Australia | Feb. 6, 1935 |